United States Patent
Watson

(10) Patent No.: US 6,512,975 B2
(45) Date of Patent: Jan. 28, 2003

(54) TRAFFIC INFORMATION SERVICE (TIS) UPLINK OWN AIRCRAFT HEADING CORRECTION

(75) Inventor: Jerry L. Watson, Mission, KS (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/828,537

(22) Filed: Apr. 6, 2001

(65) Prior Publication Data

US 2002/0188398 A1 Dec. 12, 2002

Related U.S. Application Data

(60) Provisional application No. 60/196,006, filed on Apr. 7, 2000.

(51) Int. Cl.$^7$ .............................. G01S 5/02; G08G 5/04
(52) U.S. Cl. ......................... 701/120; 701/3; 701/301; 340/961; 342/29
(58) Field of Search ........................... 701/3, 120, 300, 701/301, 224, 213, 214; 340/961; 342/450, 454, 29, 32, 357.08, 357.06

(56) References Cited

U.S. PATENT DOCUMENTS

| | | | |
|---|---|---|---|
| 4,855,748 A | 8/1989 | Brandao et al. | 342/455 |
| 5,077,673 A | 12/1991 | Brodegard et al. | 364/461 |
| 5,248,968 A | 9/1993 | Kelly et al. | 340/961 |
| 5,325,302 A | 6/1994 | Izidon et al. | 364/461 |
| 5,552,788 A | 9/1996 | Ryan et al. | 342/30 |
| 5,604,504 A | * 2/1997 | Nail | 342/147 |
| 5,627,546 A | * 5/1997 | Crow | 342/32 |
| 5,835,059 A | * 11/1998 | Nadel et al. | 342/37 |
| 6,064,335 A | * 5/2000 | Eschenbach | 340/961 |

OTHER PUBLICATIONS

Bussolari, et al.; Mode S data link applications for general aviation; Digital Avionics Systems Conf.; Nov. 1995; IEEE; pp. 199–206.*

Diefes, et al.; Concept design for a low cost cockpit display/collision avoidance system for general aviation aicraft; IEEE: 1996; pp. 352–359.*

*Minimum Operational Performance Standards for Traffice Information Services (TIS) Data Communications*, RCTA Document Number: RTCA/DO–239; ©1997.

* cited by examiner

*Primary Examiner*—Michael J. Zanelli

(57) ABSTRACT

An apparatus, method and computer program product for correcting own aircraft heading and displaying proximate aircraft traffic data on a Traffic Information Service display. The apparatus, method and computer program minimize slewing of the other aircraft data across the display during aircraft maneuvers and provides a more reliable and consistent depiction of traffic relative to own aircraft position.

5 Claims, 4 Drawing Sheets

TRAFFIC INFORMATION SERVICE (TIS) UPLINK OWN AIRCRAFT HEADING CORRECTION

CROSS-REFERENCES TO RELATED APPLICATIONS

This application claims priority from U.S. application serial number 60/196,006 entitled "Traffic Information Service (TIS) Uplink Own Aircraft Heading Correction," filed Apr. 7, 2000, now abandoned and incorporated herein by reference.

BACKGROUND OF THE INVENTION

The present invention relates generally to aircraft collision avoidance, and in particular to displaying traffic information on a display.

Aircraft pilots are expected to visually identify collision threats and avoid them. This "see and avoid" technique based on the pilot's visual sense remains the most basic method of aircraft collision avoidance. However, since the 1950's electronic techniques based on radio frequency and optical transmissions have been developed to supplement the pilot's visual sense. The government has developed and implemented a system of ground based and aircraft carried equipment designated the Air Traffic Control Radar Beacon System (ATCRBS). This system includes two different types of ground based radar emitters located at each of a plurality of Air Traffic Control (ATC) stations. One type of radar is referred to as the Primary Surveillance Radar (PSR), or simply as the primary radar. The primary radar operates by sending out microwave energy that is reflected back by the aircraft's metallic surfaces. This reflected signal is received back at the ground radar site and displayed as location information for use by an air traffic controller.

The second type of radar is referred to as the Secondary Surveillance Radar (SSR), or simply secondary radar. Unlike the primary radar, the SSR is a cooperative system in that it does not rely on reflected energy from the aircraft. Instead, the ground based SSR antenna transmits a coded 1030 MHz microwave interrogation signal. A transponder, i.e., a transmitter/receiver, carried on the aircraft receives and interprets the interrogation signal and transmits a 1090 MHz microwave reply signal back to the SSR ground site. This receive and reply capability greatly increases the surveillance range of the radar and enables an aircraft identification function, referred to as Mode-A, wherein the aircraft transponder includes an identification code as part of its reply signal. This identification code causes the aircraft's image or blip on the ATC operator's radar screen to stand out from the other targets for a short time. Thus, Mode-A provides a rudimentary identification function.

In addition to the identification function provided by Mode-A, the aircraft altimeter is typically coupled to the transponder. When the reply signal includes altitude information the secondary surveillance radar is referred to as Mode-C.

The Mode-A and Mode-C systems are unable to relay additional information or messages between the ground based SSR and the interrogated aircraft, other than the aforementioned identification and altitude information. The Mode Select, or Mode-S system, was the next evolution in aircraft surveillance. Mode-S is a combined secondary surveillance radar and a ground-air-ground data link system which provides aircraft surveillance and communication necessary to support automated air traffic control in the dense air traffic environments of today.

Mode-S incorporates various techniques for substantially reducing transmission interference and provides active transmission of messages or additional information by the ground based SSR. The Mode-S sensor includes all the essential features of ATCRBS, and additionally includes individually timed and addressed interrogations to Mode-S transponders carried by aircraft. The Mode-S system uses the same frequencies for interrogations and replies as the ATCRBS.

The Radio Technical Commission for Aeronautics (RTCA) has promulgated a specification for the Mode-S system, RTCA/DO-181A, *Minimum Operational Performance Standards For Air Traffic Control Radar Beacon System/Mode Select (ATCRBS/Mode-S) Airborne Equipment,* issued January 1992, and incorporated herein by reference. According to RTCA specification DO-181A, the airborne portion of the Mode-S system includes in one form or another at least a dedicated transponder, a cockpit mounted control panel, two dedicated antennas and cables interconnecting the other elements.

In operation, a unique 24-bit address code, or identity tag, is assigned to each aircraft in a surveillance area by one of two techniques. One technique is a Mode-S "squitter" preformed by the airborne transponder. Once per second, the Mode-S transponder spontaneously and pseudo-randomly transmits, or "squitters," an unsolicited broadcast, including a specific address code unique to the aircraft carrying the transponder, via first one and then the other of its antennas which produce an omnidirectional pattern. The transponder's transmit and receive modes are mutually exclusive to avoid damage to the equipment. Whenever the Mode-S transponder is not broadcasting, it is monitoring, or "listening," for transmissions simultaneously on its omnidirectional antennas. According to the second technique, each ground based Mode-S interrogator broadcasts an ATCRBS/Mode-S "All-Call" interrogation signal which has a waveform that can be understood by both ATCRBS and Mode-S transponders.

When an aircraft equipped with a standard ATCRBS transponder enters the airspace served by an air traffic control Mode-S interrogator, the transponder responds the with a standard. ATCRBS reply format, while the transponder of a Mode-S equipped aircraft replies with a Mode-S format that includes a unique 24-bit address code, or identity tag. This address, together with the aircraft's range and azimuth location, is entered into a file, commonly known as putting the aircraft on roll-call, and the aircraft is thereafter discretely addressed. The aircraft is tracked by the air traffic control interrogator throughout its assigned airspace and, during subsequent interrogations, the Mode-S transponder reports in its replies either its altitude or its ATCRBS 4096 code, depending upon the type of discrete interrogation received. As the Mode-S equipped aircraft moves from the airspace served by one ATC Mode-S interrogator into airspace served by another Mode-S interrogator, the aircraft's location information and discrete address code are passed on via landlines. If the information is not or cannot be passed via landlines, either the ground based SSR station picks up the Mode-S transponder's "squitter" or the aircraft Mode-S transponder responds to the All-Call interrogation signal broadcast by the next ATC Mode-S interrogator.

The unique 24-bit address code, or identity tag, assigned to each aircraft is the primary difference between the Mode-S system and ATCRBS. The unique 24-bit address code allows a very large number of aircraft to operate in the air traffic control environment without an occurrence of redundant address codes. Parity check bits overlaid on the address code assure that a message is accepted only by the intended aircraft. Thus, interrogations are directed to a particular aircraft using this unique address code and the replies are unambiguously identified.

The unique address coded into each interrogation and reply also permits inclusion of data link messages to and/or from a particular aircraft. One such use of the datalink messaging capabilities inherent in MODE-S is uplink of data regarding traffic in the vicinity of the aircraft. This service known as the "Traffic Information Service", or TIS, uplinks the MODE-S transponder data for up to eight aircraft located in the vicinity of the requesting aircraft. Data for the nearby aircraft can then be displayed to the pilot on a display and shown relative to the own aircraft data. The display of additional traffic data thus assists the pilot in avoiding collisions with other aircraft. In particular, the display identifies potential collision threats and directs the pilot where to visually scan for traffic such that the principals of see and avoid can be implemented with greater confidence and integrity. The TIS system is more fully described in the *International Civil Aviation Organization Manual on MODE-S Specific Service,* DOC 9688-AN/952, incorporated herein by reference; and in *Minimum Operational Performance Standards for Traffic Information Services (TIS) Data Communications,* RTCA document number: RTCA/DO-239 also incorporated herein by reference.

Use of the TIS service is primarily intended for small aircraft having fewer than six seats. Larger aircraft having six seats or more, must, in most cases, make use of more sophisticated, active collision avoidance systems known as TCAS. The TCAS standards are set forth in the RTCA specifications DO-185, *Minimum Operational Performance Standards for Air Traffic Alert and Collision Avoidance System (TCAS) Airborne Equipment,* issued Sep. 23, 1983, consolidated Sep. 6, 1990, and DO-1 85A, *Minimum Operational Performance Standards For Air Traffic Alert and Collision Avoidance System II (TCAS II) Airborne Equipment,* issued December 1997, both of which are incorporated herein be reference.

FIG. 1 illustrates one known embodiment of the TCAS I having 4-element interferometer antennas 2A and 2B coupled to a radio frequency receiver 3 of a TCAS processor 4. Receiver 3 is coupled in turn to a signal processor 5 operating known traffic alert and collision avoidance software. A radio frequency transmitter 6 is coupled to signal processor 5 for broadcasting Mode-S interrogation signals. An associated control panel 7 for operating TCAS I and display 8 for displaying TCAS information are each coupled to signal processor 5 of TCAS processor 4.

The TCAS antenna is driven to produce a directional microwave transmission, or radiation, pattern carrying a transponder generated coded interrogation signal at 1030 MHz, the same frequency used by ground based SSR stations to interrogate Mode-S transponders. Whenever the TCAS transponder is not broadcasting, it is "listening" for Mode-S "squitters" and reply transmissions at 1090 MHz, the same frequency used by Mode-S transponders to reply to interrogation signals. Thus, a TCAS equipped aircraft can "see" other aircraft carrying a transponder.

Once a transponder equipped target has been "seen," the target is tracked and the threat potential is determined by operation of known TCAS algorithms, as described in each of U.S. Pat. No. 5,077,673, titled, "Aircraft Traffic Alert and Collision Avoidance Device," issued Dec. 31, 1991, and U.S. Pat. No. 5,248,968, titled "TCAS II PITCH Guidance Control Law and Display Symbol," issued Sep. 28, 1993. A comparison between the altitude information encoded in the reply transmission from the threat aircraft and the host aircraft's altimeter is made in the TCAS processor. In the event a collision threat is detected, the pilot is directed to obtain a safe altitude separation, by descending, ascending or maintaining current altitude.

Knowledge of the direction, or bearing, of the target aircraft relative to the host aircraft's heading greatly enhances a pilot's ability to visually acquire the threat aircraft and provides a better spatial perspective of the threat aircraft relative to the host aircraft. The TCAS processor can control display of bearing information on a cockpit display when available. Bearing information is also used by the TCAS processor to better determine threat potential presented by an intruder aircraft. Directional antennas are used in some TCAS systems for determining angle of arrival data which is converted into relative bearing to a threat aircraft by the TCAS processor. The TCAS is also coupled to provide an output signal to one or more displays.

FIG. 2 shows one configuration of a conventional display 10 used with a TCAS collision avoidance system. Display 10 includes an aircraft symbol 12 to depict the position of the host aircraft. A circle, formed by multiple dots 14 surrounding host aircraft position symbol 12, indicates a 2 nautical mile range from the host aircraft. Generally, semi circular indicia 16 around the periphery of indicator display 10 and a rotatable pointer 18 together provide an indication of the rate of change of altitude of the host aircraft. Indicia 16 are typically marked in hundreds of feet per minute. The portion of indicia 16 above the inscriptions "0" and "6" indicates rate of ascent while the portion below indicates rate of descent.

Other target aircraft or "intruders" are identified on display 10 by indicia 30 or "tags" 20, 22 and 24. Tags 20, 22, 24 are shaped as circles, diamonds or squares and are color coded (not shown) to provide additional information. Square 20 colored red represents an intruder entering warning zone and suggests an immediate threat to the host aircraft with prompt action being required to avoid the intruder. Circle 22 colored amber represents an intruder entering caution zone and suggests a moderate threat to the host aircraft recommending preparation for intruder avoidance. Diamond 24 represents near or "proximate traffic" when colored solid blue or white and represents more remote traffic or "other traffic" when represented as an open blue or white diamond. Air traffic represented by either solid or open diamond 24 is "on file" and being tracked by the TCAS.

Each indicia or tag 20, 22, 24 is accompanied by a two digit number preceded by a plus or minus sign. In the illustration of FIG. 2, for example, a "+05" is adjacent circle tag 20, a "–03" is adjacent square tag 22 and a "–12" is adjacent diamond tag 24. Each tag may also have a vertical arrow pointing either up or down relative to the display. The two digit number represents the relative altitude difference between the host aircraft and the intruder aircraft, the plus and minus signs indicating whether the intruder is above or below the host aircraft. Additionally, the two digit number appears positioned above or below the associated tag to provide a visual cue as to the intruder aircraft's relative position: the number positioned above the tag indicates that the intruder is above the host aircraft and the number positioned below the tag indicates that the intruder is below the host aircraft. The associated vertical arrow indicates the intruder aircraft's altitude is changing at a rate in excess of 500 feet per minute in the direction the arrow is pointing. The absence of an arrow indicates that the intruder is not changing altitude at a rate greater than 500 feet per minute.

Display 10 includes several areas represented by rectangular boxes 26, 28, 30, 32, 34 which are areas reserved for word displays wherein conditions of the TCAS are reported to the pilot of the host aircraft. For example, if a portion or component of the TCAS fails, a concise textual report describing the failure appears in one of rectangular boxes 26, 28, 30, 32, 34. In another example, if the operator operates mode control 36 to select one of a limited number of operational modes, a concise textual message indicating the choice of operational mode appears in another of rectangular boxes 26, 28, 30, 32, 34. Selectable operational modes typically include a "standby" mode in which both of the host aircraft transponder systems are inactive, a "transponder on" mode in which a selected one of primary transponder and secondary transponder is active, a "traffic alert" mode in which an alert is transmitted to the host aircraft pilot is any Mode-C or Mode-S transponder equipped aircraft are entering a first predetermined cautionary envelope of airspace, and a "traffic alert/resolution advisory" mode in which a traffic alert (TA) and/or resolution advisory (RA) is issued if any Mode-C or Mode-S transponder equipped aircraft are entering a second predetermined warning envelope of airspace. The various operational modes described above are selectable by operating mode control 36.

In certain applications, the TCAS traffic display is coupled with a vertical speed indicator formed by the semi circular indicia 16 around the display periphery and a rotatable pointer 18. When a resolution advisory is issued by the TCAS processor, the vertical speed indicator indicates a rate of climb or descent that will maintain the safety of the host aircraft. In the particular example of FIG. 2, a colored arc portion 40 of the VSI scale, referenced by double cross-hatching, indicates a recommended rate of climb intended to ensure the safety of the host aircraft. Another colored arc portion 42 of the VSI scale, referenced by single cross-hatching, indicates a rate of descent which the TCAS processor advises the host aircraft against the executing in the current situation. The operator of the intruder aircraft receives instructions coordinated with the instructions provided host aircraft TCAS.

The TIS display is similar to the display of FIG. 2. The TIS display does not, however, include resolution advisory data because the TIS merely uplinks the transponder data. The TIS airborne component does not include the TCAS interrogation capability or the TCAS anticollision algorithms.

The TIS display also possesses a limitation not found in the TCAS display of larger aircraft. In particular, the TIS airborne component receives as uplinked data the own aircraft ground track data. This data is used in conjunction with the MODE-S data of other aircraft to depict the positions of the other aircraft relative to the pilot's own aircraft. Thus, if the aircraft maneuvers, for example, by executing a turn, the intruder aircraft will slew from a first position to a second position when the next uplink of traffic data is received without a coordinated transition during the turn. This radical reorientation on the display of other aircraft can be disorienting to the pilot and degrade the pilot's situational awareness.

In larger aircraft having a TCAS system the relative bearing between aircraft is derived in the manner previously described by noting the phase differences of the transponder signals received from other interrogated aircraft. Such a procedure is not possible in the TIS system since the own aircraft does not receive the MODE-S data directly from the other aircraft but as an uplinked message from the ground. This architecture means that the positions of the other aircraft are uplinked only every 5 seconds. In addition, the airborne aircraft component of the TIS system is intended for installation on smaller aircraft which often do not have a sensor with which to supply own aircraft heading to the TIS system. The TIS system cannot therefore correct the relative positions of intruder aircraft depicted on the display to account for differences between the own aircraft uplinked ground track and own aircraft heading.

BRIEF SUMMARY OF THE INVENTION

An apparatus, method and computer program product for correcting own aircraft heading and displaying proximate aircraft traffic data on a Traffic Information Service display. The apparatus, method and computer program minimize slewing of the other aircraft data across the display during aircraft maneuvers and provides a more reliable and consistent depiction of traffic relative to own aircraft position.

According to one aspect of the invention, the own aircraft groundtrack uplinked in the TIS message is compared to the current groundtrack received from an airborne sensor. The difference between the two values is used as the correction applied to the relative bearing of intruder aircraft. The display of the current invention thus more accurately depicts the relative positions of the intruder aircraft.

DETAILED DESCRIPTION OF THE INVENTION

Figure 3:
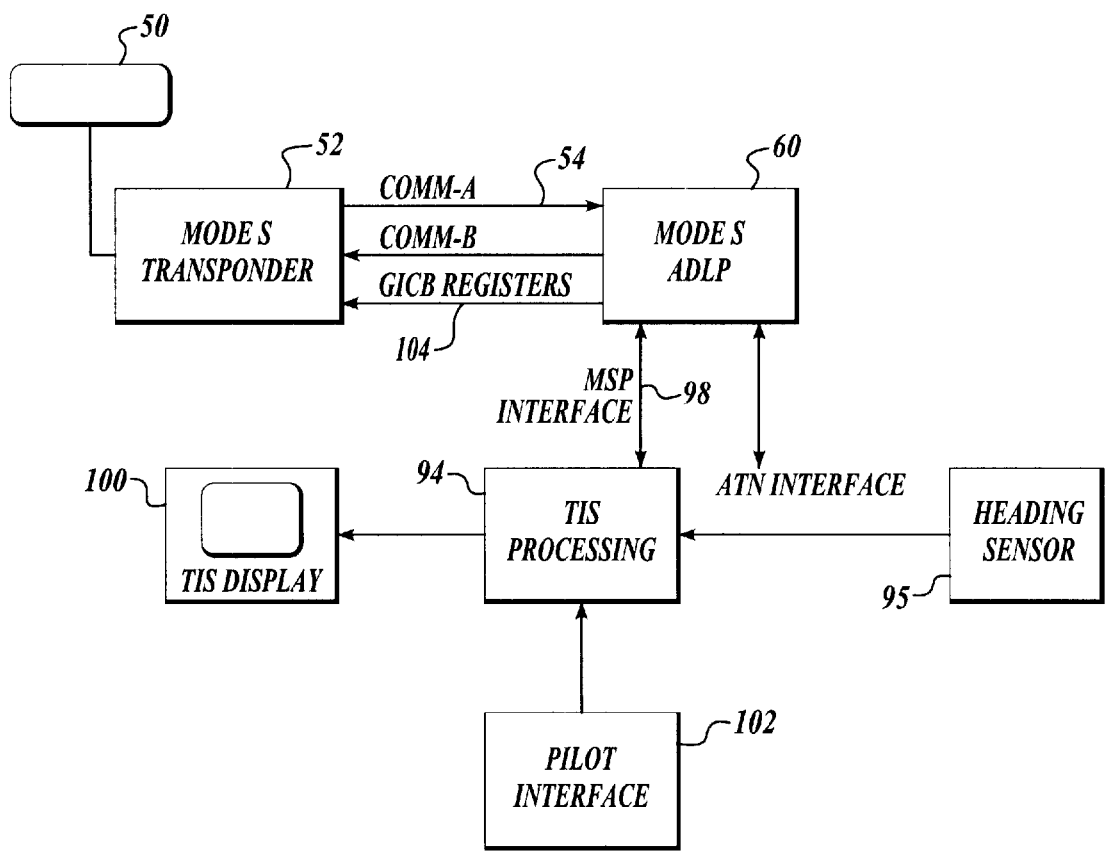
FIG. 3 is a block diagram of a Traffic Information Service system.

FIG. 3 contains a block diagram of the TIS system airborne component. The airborne component of FIG. 3 may comprise an avionics system carried aboard the aircraft as part of the aircraft's suite of avionics, or optionally may be included in a handheld or other portable device carried aboard the plane by the crew which interfaces with the aircraft transponder. In the diagram of FIG. 3, the TIS airborne component includes an antenna 50 and a transponder 52 for receiving Mode S signals broadcast from a ground station containing the TIS data for nearby aircraft. The TIS data received by Mode S transponder 52 is then forwarded via a communication data bus 54 to a Mode S airborne data link processor, or ADLP, 60. The ADLP processor 60 comprises a bi-directional transponder interface which processes each TIS message received and presents the message contents to a TIS processor via an interface 98. As explained in greater detail below, the TIS message includes transponder data for up to eight nearby aircraft including aircraft bearing, range, relative altitude, ground track, as well as own aircraft ground track. In a preferred embodiment of the invention, interface 98 comprises a Mode S specific protocol as described in the above referenced RTCA document D0-239.

Figure 1:
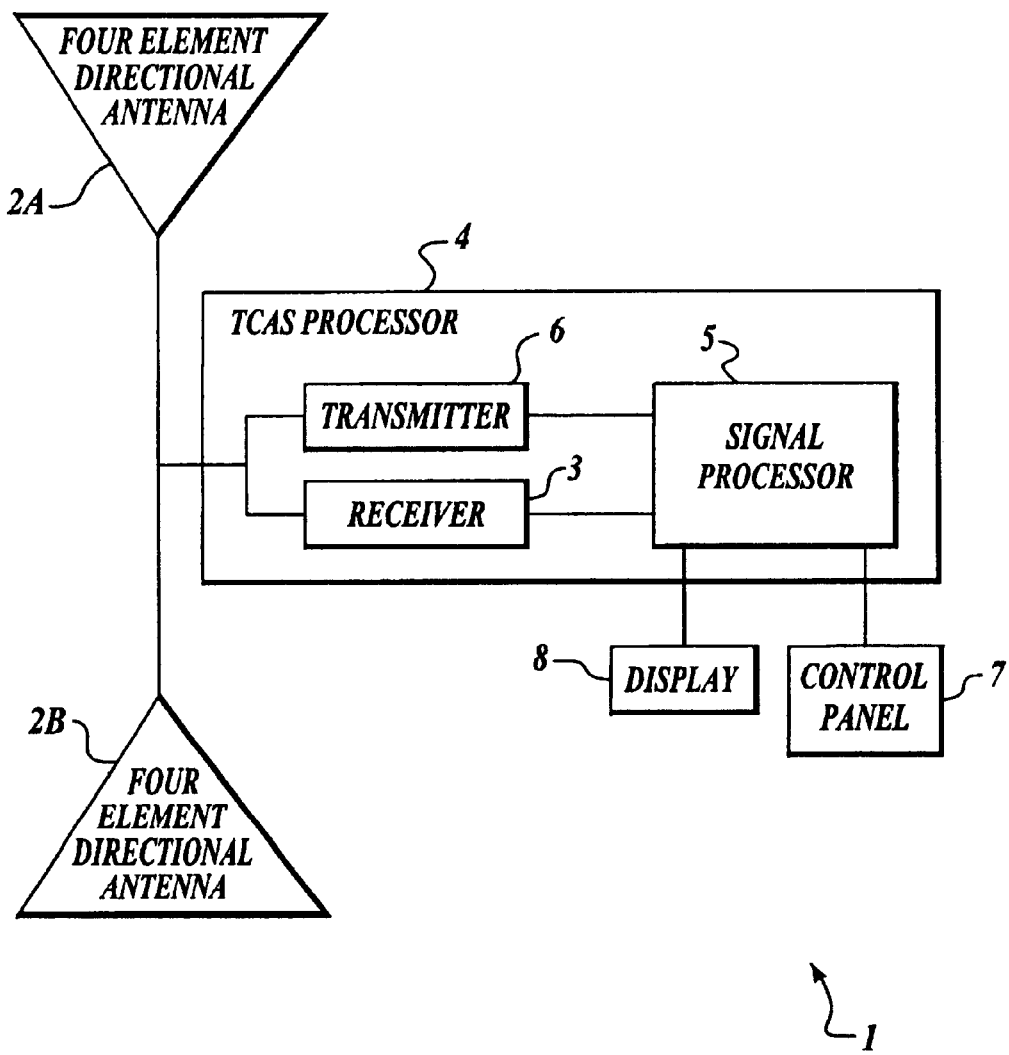
FIG. 1 is a block diagram of a TCAS system as currently used on aircraft.
Figure 2:
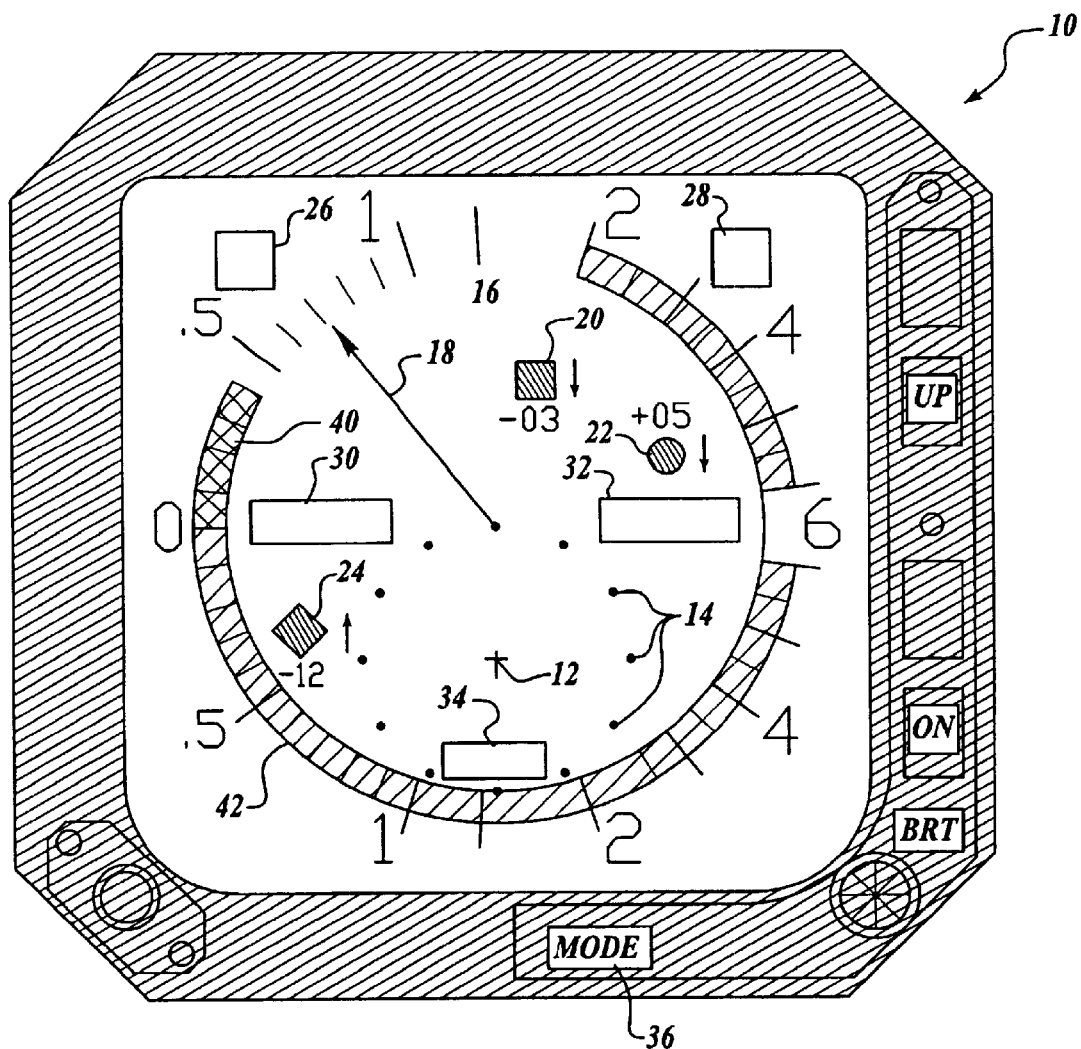
FIG. 2 is a display of traffic on a TCAS cockpit display as currently used on aircraft.

The TIS processor 94 drives a TIS display 100 for displaying to the pilot traffic in the vicinity of the aircraft. In a preferred embodiment of the invention, TIS display 100 displays traffic using the symbology used on a conventional TCAS display as shown in FIG. 2. The TIS display, however, does not display resolution advisory information since the TIS system merely displays traffic and does not include the collision avoidance algorithms present in TCAS systems.

The TIS display 100 may be a multipurpose display also used for displaying, for example, weather data, terrain data, and/or navigation data. When the pilot wishes to view TIS data, the pilot so indicates by initiating a request using a pilot interface 102. In a preferred embodiment of the invention, interface 102 may comprise a select button or switch that signals to the TIS processor 94 that TIS information should be displayed on display 100.

In response to the TIS data request received at interface 102, TIS processor 94 instructs airborne data link processor 60 to downlink a request for such data in the Mode S communications broadcast to the ground by transponder 52. As shown in FIG. 3, a data link 104 known as a GICB, or ground initiated comm-B, link encodes the TIS data request for inclusion in the downlink broadcast by transponder 52.

The TIS message uplinked from the ground has the structure given in Table I below. Each uplinked message consists of 56 bits with each message field having the bit widths shown in Table I.

TABLE I

TIS Uplink Message Structure

| Header | Message Type | Traffic Block 1 | Traffic Block 2 |
|---|---|---|---|
| 8 | 6 | 21 | 21 |

As shown in Table I, each TIS uplink message contains two 21 bit Traffic Blocks. Each of these Traffic Block fields contain six subfields as documented in Table II below. The six subfields describe the bearing, range, relative altitude, altitude rate and heading for a single intruder aircraft. Hence, data for a maximum of two aircraft can be uplinked in a single TIS message. Up to four TIS messages may be uplinked to any given aircraft in a single scan. Thus, data for eight intruder aircraft can be sent to the requesting aircraft in response to an active TIS request.

The traffic bearing field is a six bit field containing the bearing angle from the own-aircraft to the alert aircraft quantitized in six degree increments. The bearing angle is defined with respect to the own aircraft ground track.

TABLE II

Traffic Information Block Data Fields

| Traffic Bearing | Traffic Range | Relative Altitude | Altitude Rate | Traffic Heading | Traffic Status |
|---|---|---|---|---|---|
| 6 | 4 | 5 | 2 | 3 | 1 |

Three types of TIS messages can be contained in the uplinked message. The three types of messages are: "keep-alive," "good-bye," and traffic data. The particular type of message is specified by the value of the bits contained in the message type field as given in Table III below.

TABLE III

Message Type Field Values

| Message Type value | TIS Message Uplink Type |
|---|---|
| 0 < OH < 60 | Traffic Data, first segment |
| 60 | Traffic Data, intermediate segment(s) |
| 61 | Traffic Data, final segment |
| 62 | Goodbye |
| 63 | Keep-Alive |

The "first segment" traffic data message contains the Mode S derived ground track of the aircraft receiving the TIS uplinked message. The ground track is given in six degree increments and referenced to magnetic north. The "OH," or own heading, value in the message field is provided to permit the display processor to correct for differences between the aircraft ground track and the aircraft heading as would occur when the aircraft is maneuvering or crabbing into the wind. However, the OH correction can only be used when an airborne heading sensor 95 is utilized. Smaller aircraft of the type envisioned to use the TIS system may not have the capability to provide this sensor input to the TIS system. In addition, hand-held or portable TIS units would receive own aircraft data from a GPS which provides ground track only and does not include aircraft heading data.

Figure 4:
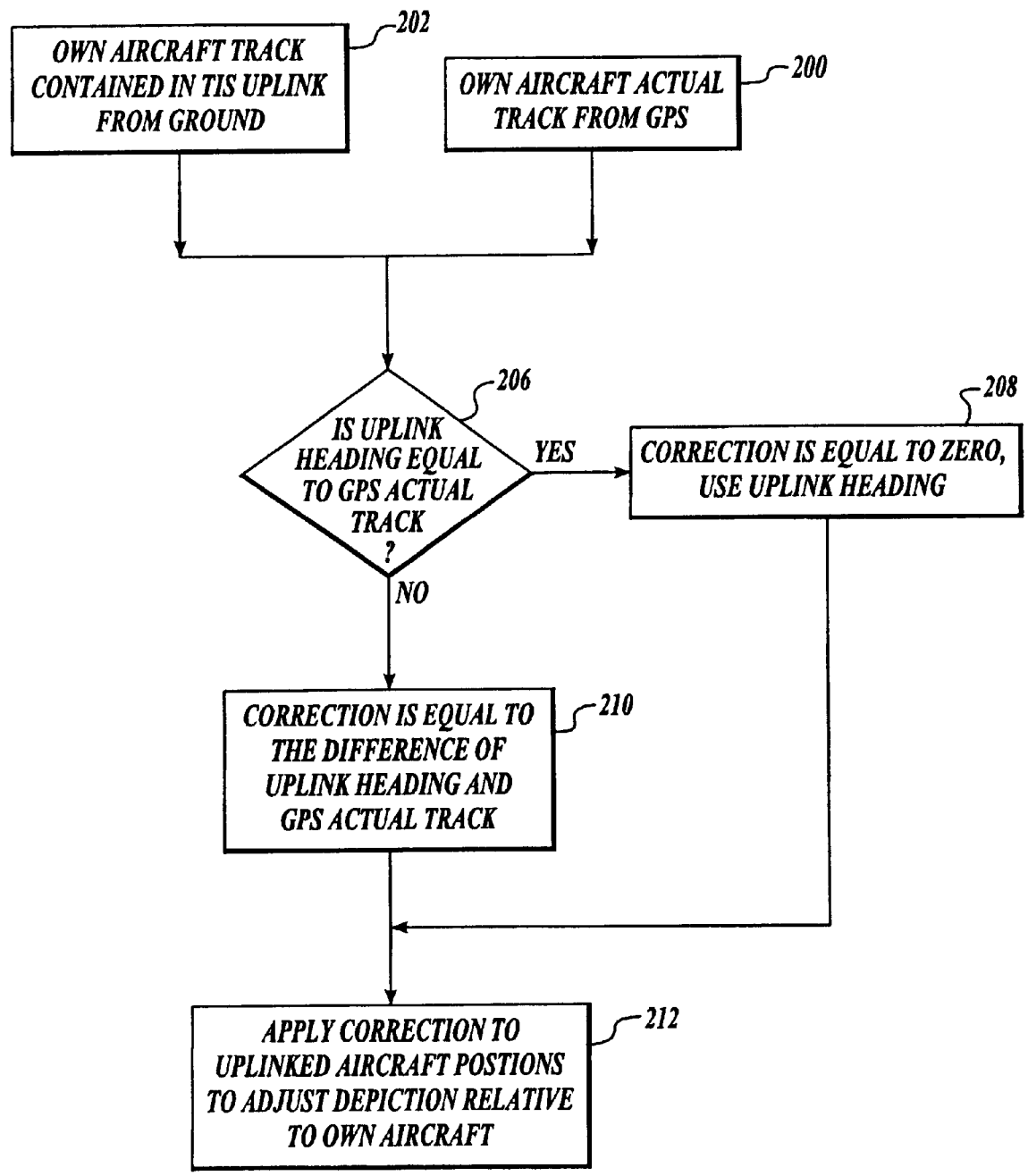
FIG. 4 is a flow chart illustrating heading correction according to an embodiment of the present invention.

The present invention permits the correct orientation of the intruder aircraft on the display relative to the own aircraft when an airborne heading sensor is not available. The present invention thus permits the display to show the correct orientation of intruder aircraft when maneuvering. FIG. 4 depicts a flow chart for correcting intruder aircraft orientation in the absence of own heading data according to an embodiment of the present invention. In the flow chart of FIG. 4, the aircraft actual track data is received from, for example, an onboard or portable GPS device. The TIS uplink message contains the own aircraft track heading as derived from the downlinked Mode S data. The actual track 200 received from the on board GPS device and the uplinked track data 202 received in the uplinked data message are compared in step 206. If the two tracks are substantially equal then the aircraft is not likely to be maneuvering and no correction need to be applied to the display. The uplinked track heading may therefore be used to depict intruder aircraft relative to the own aircraft as shown in step 208. If the uplinked track and the actual track differ, then a correction equal to the difference between the two measures is calculated in step 210. In step 212 this correction is applied to the uplinked intruder aircraft positions to better depict the positions of these aircraft relative to the own aircraft on the display.

The correction logic of FIG. 4 may be implemented as software, executable code, firmware, or as a microelectronic circuit. In a preferred embodiment of the invention, the invention is implemented as code stored in a flash memory device and located in the TIS display processor. However, the invention may be implemented as part of any general purpose processor located aboard the aircraft. For example, the invention may be hosted in transponder 52, or alternatively, in Mode S ADLP 60.

The invention has now been described with reference to the preferred embodiments. Variations and modifications will be readily apparent to those of ordinary skill in the art. For these reasons, the invention is to be interpreted in view of the claims.

What is claimed is:

1. A method for showing on a display, the position of intruder aircraft relative to an own aircraft comprising the steps of:
   receiving a message uplinked from a ground station wherein said message includes a bearing of the intruder aircraft referenced from an uplinked groundtrack of the own aircraft;
   comparing said uplinked groundtrack received in said message with a groundtrack measurement received from an airborne device;
   determining a correction by obtaining a difference between said uplinked groundtrack and said groundtrack measurement;
   applying said correction to said bearing to obtain a corrected bearing; and
   displaying the intruder aircraft on the display at said corrected bearing from the own aircraft.

2. A computer program product for displaying on a display the position of intruder aircraft relative to an own aircraft comprising:
   a computer readable storage medium having a computer readable program code means embedded in said medium, said computer readable program code means comprising:
      a first computer instruction means for receiving a message uplinked from a ground station wherein said message includes a bearing of the intruder aircraft referenced from an uplink groundtrack of the own aircraft;
      a second computer instruction means for comparing said uplinked groundtrack received in said message with a groundtrack measurement received from an airborne device;
      a third computer instruction means for determining a correction by obtaining a difference between said uplinked groundtrack and said groundtrack measurement;
      a fourth computer instruction means for applying said correction to said bearing to obtain a corrected bearing; and
      a fifth computer instruction means for displaying the intruder aircraft on the display at said corrected bearing from the own aircraft.

3. An apparatus for displaying intruder aircraft relative to an own aircraft in a Traffic Information System (TIS) comprising:
   an input coupled to receive:
      an uplinked message including a bearing of the intruder aircraft referenced from an uplinked groundtrack of the own aircraft; and
      a groundtrack measurement of the own aircraft received from an airborne sensor;
   an output;
   a signal processor, coupled to said input and to said output for:
      obtaining a difference between said uplinked groundtrack and said groundtrack measurement to obtain a bearing correction; and
      applying said bearing correction to said bearing to obtain a corrected bearing;
      outputting a signal useful for controlling a display to control display of the intruder aircraft relative to the own aircraft at said corrected bearing from the own aircraft.

4. An improvement to a Traffic Information Service (TIS) system, the improvement comprising:
   an airborne component for:
      (a) receiving an uplinked message including at least a bearing data of an intruder aircraft and an own aircraft groundtrack and for receiving an own aircraft groundtrack measurement from an airborne sensor; and
      (b) comparing said own aircraft groundtrack and said groundtrack measurement to obtain a correction to said bearing data.

5. The improvement of claim 4 further comprising a cockpit display coupled to said airborne component, wherein said cockpit displays a position of the intruder aircraft relative to the own aircraft using said correction to said bearing data.

* * * * *